(12) United States Patent
Chiang et al.

(10) Patent No.: US 11,416,717 B2
(45) Date of Patent: Aug. 16, 2022

(54) CLASSIFICATION MODEL BUILDING APPARATUS AND CLASSIFICATION MODEL BUILDING METHOD THEREOF

(71) Applicant: Institute For Information Industry, Taipei (TW)

(72) Inventors: Chen-Kuo Chiang, Taipei (TW); Hao-Ting Li, Taipei (TW); Chih-Cheng Lin, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 446 days.

(21) Appl. No.: 16/741,707

(22) Filed: Jan. 13, 2020

(65) Prior Publication Data

US 2021/0150284 A1 May 20, 2021

(30) Foreign Application Priority Data

Nov. 15, 2019 (CN) .......................... 201911117515.9

(51) Int. Cl.
*G06K 9/62* (2022.01)
*G06N 20/10* (2019.01)
*G06N 3/08* (2006.01)

(52) U.S. Cl.
CPC ......... *G06K 9/6272* (2013.01); *G06K 9/6223* (2013.01); *G06N 3/084* (2013.01); *G06N 20/10* (2019.01)

(58) Field of Classification Search
CPC .............................. G06N 20/10; G06N 3/084
See application file for complete search history.

(56) References Cited

U.S. PATENT DOCUMENTS

| 10,025,950 | B1 * | 7/2018 | Avasarala | G06V 10/82 |
| 2019/0108423 | A1 * | 4/2019 | Jones | G06K 9/6269 |
| 2019/0303754 | A1 * | 10/2019 | Ranjan | G06N 3/08 |

FOREIGN PATENT DOCUMENTS

CN 107358264 A 11/2017

* cited by examiner

*Primary Examiner* — Edward Park
(74) *Attorney, Agent, or Firm* — Birch, Stewart, Kolasch & Birch, LLP

(57) ABSTRACT

A classification model building apparatus and a classification model building method thereof are provided. The classification model building apparatus introduces a clustering algorithm to assist in training a deep learning model for classification and takes a sum of a clustering loss function, a center concentration loss function and a classification loss function multiplied by different weights, respectively, as a total loss function for training the deep learning model. Based on the total loss function, the classification model building apparatus adjusts parameters of the deep learning model through a backpropagation algorithm to build a classification model.

10 Claims, 4 Drawing Sheets

CLASSIFICATION MODEL BUILDING APPARATUS AND CLASSIFICATION MODEL BUILDING METHOD THEREOF

PRIORITY

This application claims priority to China Patent Application No. 201911117515.9 filed on Nov. 15, 2019, which is hereby incorporated by reference in its entirety.

FIELD

The present invention relates to a classification model building apparatus and a classification model building method thereof. More particularly, the classification model building apparatus of the present invention integrates a clustering algorithm to assist in training a deep learning model for classification by an end-to-end manner so as to build a classification model.

BACKGROUND

With the rapid development of science and technology, the machine learning and the deep learning nowadays have become the main study of science and technology and have been widely applied in various fields such as the field of computer vision, the field of image analysis, the field of detection and identification, etc. For example, most of current wearable devices have motion sensors (e.g., gravity sensors) mounted therein, so such wearable device may identify actions of a user to perform corresponding operations.

However, classification is still a basic and important issue in the deep learning field. Even there are more and more various classification models, increasing the classification accuracy is still a major goal. Accordingly, how to training a deep learning model for classification to increase the classification accuracy is an urgent need existing in the art.

SUMMARY

An objective herein is to provide a mechanism for training a deep learning model, which integrates a clustering algorithm to assist in training the deep learning model for classification by an end-to-end manner, thereby increasing the classification accuracy.

The disclosure includes a classification model building apparatus comprising a storage and a processor. The storage is configured to store a plurality of training data and a deep learning model. The processor is electrically connected to the storage, and can be configured to execute the following operations, including: (a) inputting the training data into the deep learning model; (b) retrieving a plurality of feature vectors corresponding to the training data and a plurality of the classification results corresponding to the training data from the deep learning model; (c) dividing the feature vectors into a plurality of groups based on a clustering algorithm; (d) establishing a clustering loss function of the feature vectors based on the groups; (e) establishing a center concentration loss function of the feature vectors based on the classification results; (f) establishing a classification loss function of the classification results;

(g) taking a sum of the clustering loss function multiplied by a first weight, the center concentration loss function multiplied by a second weight and the classification loss function multiplied by a third weight as a total loss function; (h) calculating a gradient of the total loss function with respect to a plurality of parameters of the deep learning model based on a backpropagation algorithm; (i) adjusting the parameters of the deep learning model based on the gradient; (j) repeatedly executing the operations (a) to (i) to minimize a function value of the total loss function; and (k) building a classification model based on the deep learning model with the adjusted parameters when the function value of the total loss function has been minimized.

The disclosure also includes a classification model building method for a classification model building apparatus. The classification model building apparatus can comprise a storage and a processor. The storage stores a plurality of training data and a deep learning model. The classification model building method is executed by the processor and can comprise the following steps, including: (a) inputting the training data into the deep learning model; (b) retrieving a plurality of feature vectors corresponding to the training data and a plurality of the classification results corresponding to the training data from the deep learning model; (c) dividing the feature vectors into a plurality of groups based on a clustering algorithm; (d) establishing a clustering loss function of the feature vectors based on the groups; (e) establishing a center concentration loss function of the feature vectors based on the classification results; (f) establishing a classification loss function of the classification results; (g) taking a sum of the clustering loss function multiplied by a first weight, the center concentration loss function multiplied by a second weight and the classification loss function multiplied by a third weight as a total loss function; (h) calculating a gradient of the total loss function with respect to a plurality of parameters of the deep learning model based on a backpropagation algorithm; (i) adjusting the parameters of the deep learning model based on the gradient; (j) repeatedly executing the steps (a) to (i) to minimize a function value of the total loss function; and (k) building a classification model based on the deep learning model with the adjusted parameters when the function value of the total loss function has been minimized.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. These example embodiments are not intended to limit the present invention to any particular environment, embodiment, example, applications or implementations described in these example embodiments. Therefore, description of these example embodiments is only for purpose of illustration rather than to limit the present invention.

It shall be appreciated that in the following embodiments and the attached drawings, elements unrelated to the present invention are omitted from depiction; and dimensional relationships among individual elements in the attached drawings are illustrated only for ease of understanding, but not to limit the actual scale.

Figure 1:
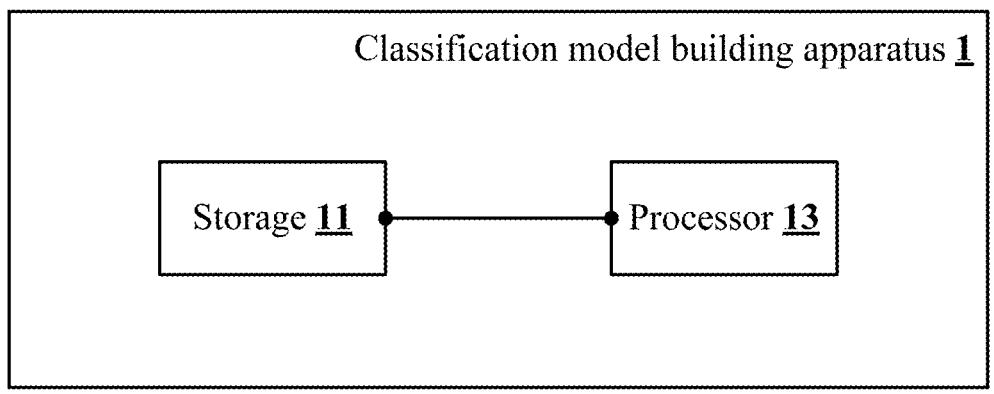
FIG. 1 is a schematic view of the classification model building apparatus 1 according to the present invention.
Figure 2:
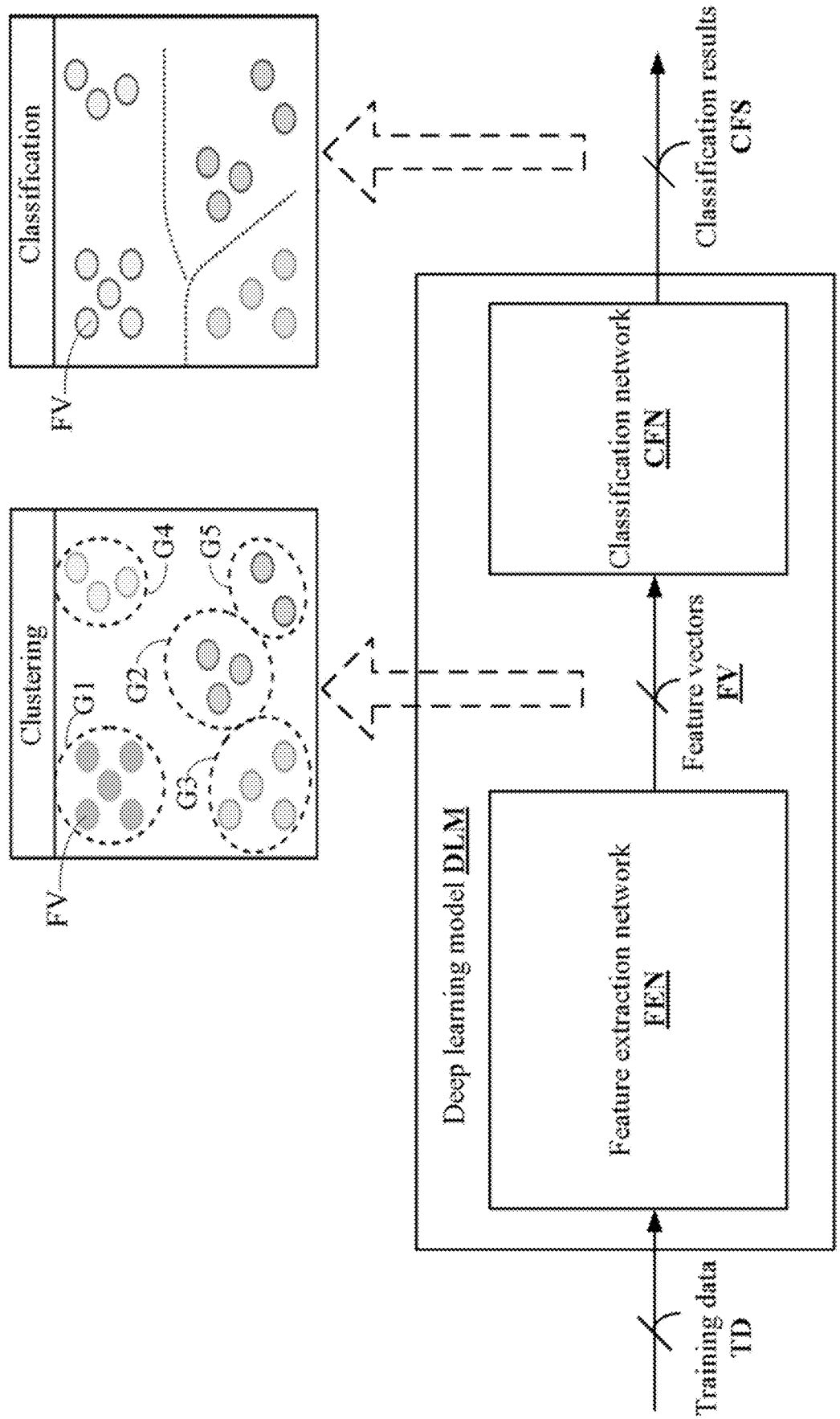
FIG. 2 is a schematic view depicting that the classification model building apparatus 1 trains a deep learning model according to the present invention.

The first embodiment of the present invention is as shown in FIG. 1 and FIG. 2. FIG. 1 is a schematic view of the classification model building apparatus 1 of the present invention. FIG. 2 is a schematic view depicting that the classification model building apparatus 1 trains a deep learning model according the present invention. The classification model building apparatus 1 comprises a storage 11 and a processor 13. The classification model building apparatus 1 may be a cloud server, a personal computer or any device having computing and processing capability. For simplifying the description, other components of the classification model building apparatus 1, such as the network interface, the housing, the power supply module and other components that are less relevant to the present invention, are omitted from depiction in the drawings.

The processor 13 is electrically connected to the storage 11. The processor 13 may be any of various processors, Central Processing Units (CPUs), microprocessors, digital signal processors, or other computing devices being capable of performing a machine learning or a deep learning and being known to those of ordinary skill in the art. The storage 11 stores a plurality of training data TD and a deep learning model DLM. The training data TD may be received from a device (e.g., a wearable device) via a transmission interface (e.g., a wired transmission interface or a wireless transmission interface). The deep learning model DLM is one of a convolution neural network (CNN) model, a recurrent neural network (RNN) and a combination thereof (but not limited thereto).

The deep learning model DLM can be divided into two portions, i.e., the feature extraction network FEN and the classification network CFN. The feature extraction network FEN is mainly used for extracting the feature vectors, and the classification network CFN is mainly used for classifying the feature vectors. Taking the CNN model as an example, the feature extraction network FEN may include at least one convolution layer and at least one subsampling layer (also called the pooling layer), and the classification network CFN may include a fully connected layer. Since those of ordinary skill in the art would appreciate that all kinds of deep learning models for classification can be applied into the present invention and would understand how the deep learning models extract the feature vectors and classify the feature vectors, the details will not further described herein.

The processor 13 inputs the training data TD into the deep learning model DLM. Next, the processor 13 can retrieve a plurality of feature vectors FV corresponding to the training data TD and a plurality of the classification results CFS corresponding to the training data TD from the deep learning model DLM. Each of the classification results CFS is represented by a classification vector, and the element having the maximum value in the classification vector is used for determining which category the classification vector can be labeled as (i.e., which category the training data TD and the feature vector FV corresponding to the classification result CFS belong to). Those of ordinary skill in the art could appreciate that the number of categories can be set according to the requirement in practice. Different from the prior art, for the purpose of increasing the classification accuracy, the present invention introduces a clustering algorithm for clustering the feature vectors FV to assist in training the deep learning model DLM for classification. The clustering algorithm may be a K-means algorithm, but not limited thereto. Therefore, after retrieving the feature vectors FV, the processor 13 divides the feature vectors FV into a plurality of groups (e.g., the group G1-G5 as shown in FIG. 2) based on the clustering algorithm.

Afterwards, based on the groups, the processor 13 establishes a clustering loss function $L_{Clustering}$ of the feature vectors FV. For example, the clustering loss function $L_{Clustering}$ may be established by using a mean squared error function, as follows:

$$L_{Clustering} = \frac{1}{2}\sum_{i} \|x_i - k_{\lambda_i}\|_2^2$$

where $x_i$ represents the $i^{th}$ feature vector FV, $\lambda_i$ represents the group which the feature vector $x_i$ belongs to, and $k_{\lambda_i}$ represents the centroid of those feature vectors in the group $\lambda_i$ corresponding to the feature vector $x_i$.

Next, based on the classification results CFS, the processor 13 establishes a center concentration loss function $L_{Center}$ of the feature vectors FV. For example, the center concentration loss function $L_{Center}$ may be also established by using a mean squared error function, as follows:

$$L_{Center} = \frac{1}{2}\sum_{i} \|x_i - C_{y_i}\|_2^2$$

where $x_i$ represents the $i^{th}$ feature vector FV, $y_i$ represents the classification result CFS of the feature vector $x_i$ and corresponds to a category, and $C_{yi}$ represents the centroid of those feature vectors in the category corresponding to the feature vector $x_i$ (i.e., the category which the classification result $y_i$ corresponds to).

Besides, based on the classification results CFS, the processor 13 further establishes a classification loss function $L_{CE}$ of the classification results CFS. For example, the classification loss function $L_{CE}$ may be established by using a cross entropy error function, as follows:

$$L_{CE} = -\frac{1}{m}\sum_{i} y_i \log \hat{y}_i$$

where m represents the total number of the samples (i.e., the total number of the training data TD or the total number of the feature vectors FV), $y_i$ represents the classification result CFS of the feature vector $x_i$, and $\hat{y}_i$ represents the probability vector including the probabilities that the classification result $y_i$ corresponds to every category.

The above examples of the clustering loss function $L_{Clustering}$, the center concentration loss function $L_{Center}$ and the classification loss function $L_{CE}$ are only used to illustrate these loss functions could be established by using what kinds of functions, but not used to limit the scope of the present invention. After establishing these loss functions, the processor 13 takes a sum of the clustering loss function $L_{Clustering}$ multiplied by a first weight $w_1$, the center concentration loss function $L_{Center}$ multiplied by a second weight $w_2$ and the classification loss function $L_{CE}$ multiplied by a third weight $w_3$ as a total loss function $L_{Total}$ as follows:

$$L_{Total} = w_1 \cdot L_{Clustering} + w_2 \cdot L_{Center} + w_3 \cdot L_{CE}.$$

Afterwards, the processor 13 calculates a gradient of the total loss function $L_{Total}$ with respect to a plurality of parameters (may also called hyperparameters) of the deep learning model DLM based on a backpropagation algorithm, and adjusts the parameters of the deep learning model DLM based on the gradient. Since each element of the feature vectors FV and the classification results CFS (i.e., the classification vectors) can be represented by taking the parameters of the deep learning model DLM as its variables, the adjustment of the parameters of the deep learning model DLM would be determined based on the gradient of the total loss function $L_{Total}$ calculated by using the backpropagation algorithm. According to the above descriptions, how to adjust the parameters of the deep learning model DLM based on the backpropagation algorithm shall be appreciated by those of ordinary skill in the art, and thus will not be further described herein.

After adjusting the parameters of the deep learning model DLM, the processor 13 re-inputs the training data TD into the deep learning model DLM whose parameters has been adjusted, and repeatedly executes the above operations to minimize the function value of the total loss function $L_{Total}$. Finally, when the function value of the total loss function $L_{Total}$ has been minimized, the processor 13 builds a classification model based on the deep learning model DLM with the adjusted parameters. By this way, the built classification model of the present invention can be used for identifying the actual input data. For example, when the classification model is applied to a wearable device and the input data are the data generated by the motion sensor of the wearable device, the wearable devices can identify actions of the user.

It shall be appreciated that those of ordinary skill in the art can understand the above determination of whether the function value of the total loss function $L_{Total}$ has been minimized may have various criteria for different practical implementations. For example, when the vary of the function value of the total loss function $L_{Total}$ has reached convergence after adjusting the parameters of the deep learning model DLM several times, the processor 13 can determine that the function value of the total loss function $L_{Total}$ has been minimized.

Figure 3A:
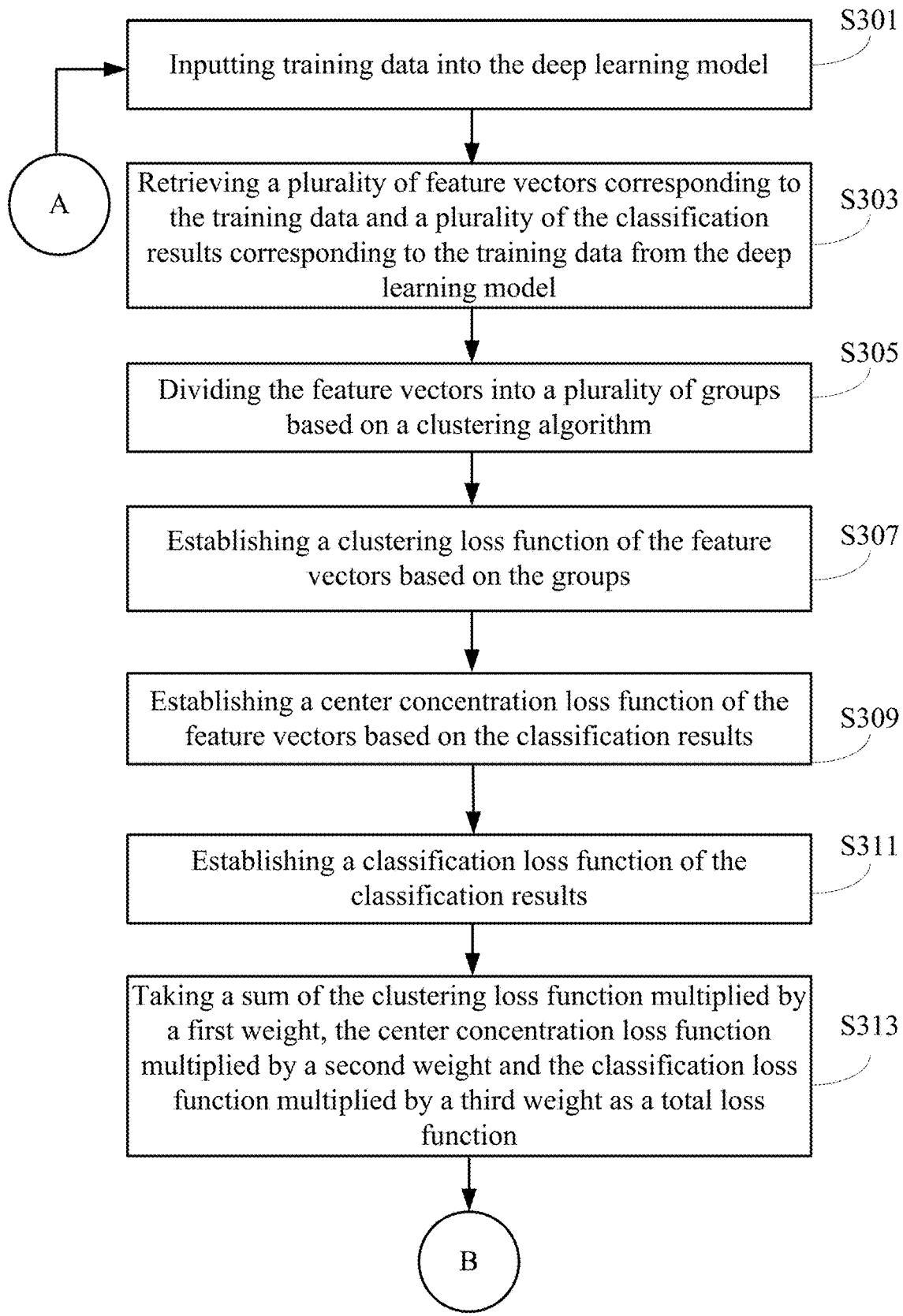
FIGS. 3A-3B are a flowchart diagram of a classification model building method according to the present invention.
Figure 3B:
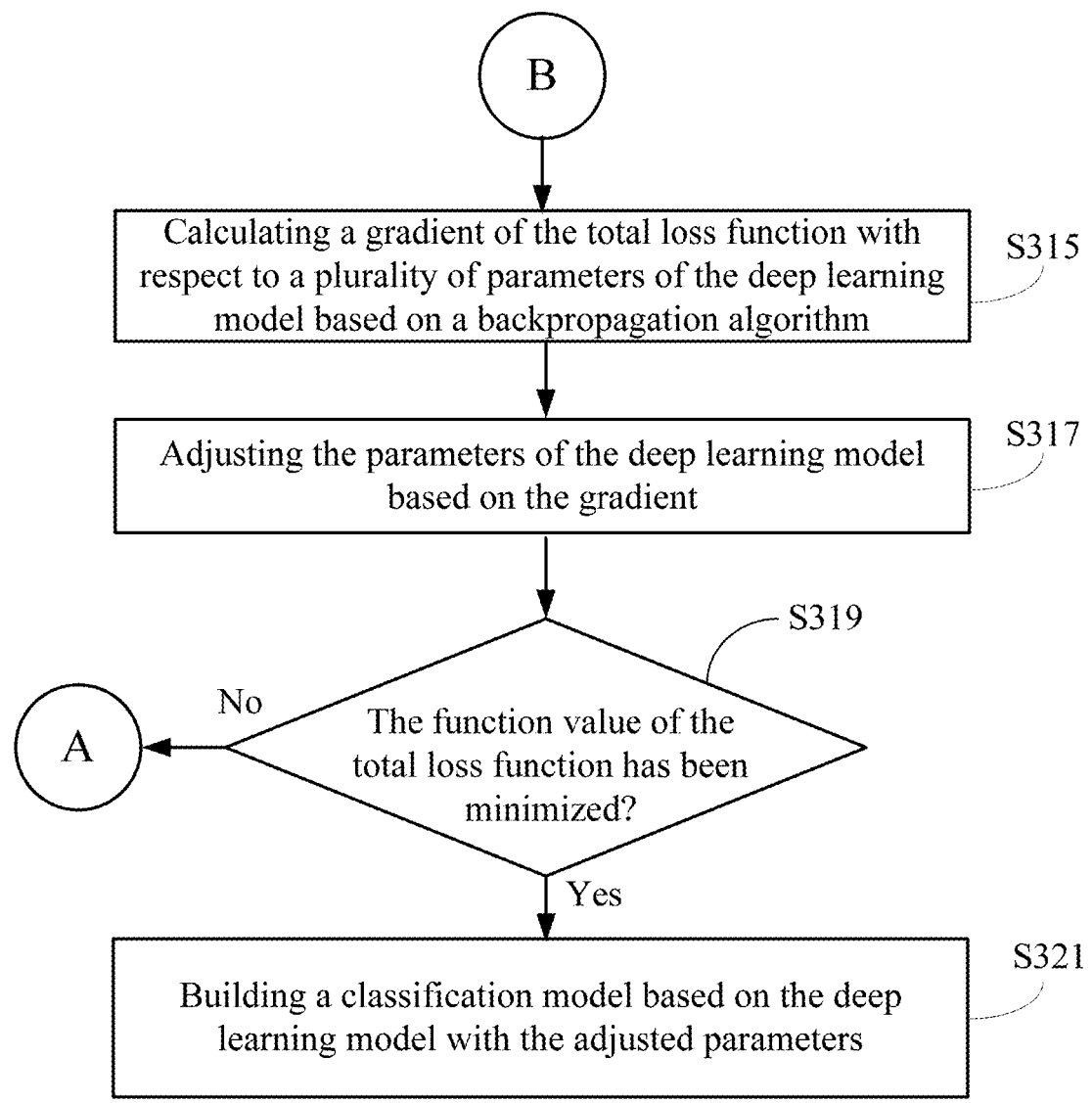

A second embodiment of the present invention is as shown in FIGS. 3A-3B, which is a flowchart diagram of the classification model building method according to the present invention. The classification model building method may be used in a classification model building apparatus (e.g., the classification model building apparatus 1 of the first embodiment), and the classification model building apparatus comprises a storage and a processor. The storage is configured to store a plurality of training data and a deep learning model. The classification model building method is executed by the processor and the following steps thereof are described as follows.

First, step S301 is executed to input the training data into the deep learning model. Step S303 is executed to retrieve a plurality of feature vectors corresponding to the training data and a plurality of the classification results corresponding to the training data from the deep learning model. Next, step S305 is executed to divide the feature vectors into a plurality of groups based on a clustering algorithm. Step S307 is executed to establish a clustering loss function of the feature vectors based on the groups. Step S309 is executed to establish a center concentration loss function of the feature vectors based on the classification results. Step S311 is executed to establish a classification loss function of the classification results. It shall be noted that the execution sequence of step S307 to step S309 is not limited as shown in FIG. 3A; that is to say, the execution sequence of step S307 to step S309 may be changed according to the practical program design, and such execution sequence would not be used to limit the scope of the present invention.

Afterwards, step S313 is executed to take a sum of the clustering loss function multiplied by a first weight, the center concentration loss function multiplied by a second weight and the classification loss function multiplied by a third weight as a total loss function. Step S315 is executed to calculating a gradient of the total loss function with respect to a plurality of parameters of the deep learning model based on a backpropagation algorithm. Step S317 is executed to adjust the parameters of the deep learning model based on the gradient. Next, step S319 is executed to determine whether the function value of the total loss function has been minimized.

When the function value of the total loss function has been minimized, step S321 is executed to build a classification model based on the deep learning model with the adjusted parameters. Conversely, if the function value of the total loss function has not been minimized, then it returns back to step S301 and repeatedly executes step S301 to step S317 to adjust the parameters of the deep learning model until the function value of the total loss function has been minimized.

In one embodiment, the clustering algorithm is a K-means algorithm. In one embodiment, the deep learning model is one of a convolution neural network (CNN) model, a recurrent neural network (RNN) and a combination thereof.

In one embodiment, each of the clustering loss function and the center concentration loss function is established by using a mean squared error function. In one embodiment, the classification loss function is established by using a cross entropy error function.

In addition to the aforesaid steps, the classification model building method of the present invention can also execute all the operations described in the aforesaid embodiment and have all the corresponding functions, and how this embodiment executes these operations and has these functions based on the aforesaid embodiment shall be readily appreciated by those of ordinary skill in the art, and thus will not be further described herein.

According to the above descriptions, the classification model building apparatus integrates a clustering algorithm to assist in training the deep learning model for classification by an end-to-end manner so as to increase the classification accuracy. Therefore, by the mechanism for training the deep learning model as described above, the present invention is able to build the classification model with high classification accuracy.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A classification model building apparatus comprising:
a storage, being configured to store a plurality of training data and a deep learning model; and
a processor electrically connected to the storage, being configured to execute the following operations:
(a) inputting the training data into the deep learning model;
(b) retrieving a plurality of feature vectors corresponding to the training data and a plurality of the classification results corresponding to the training data from the deep learning model;
(c) dividing the feature vectors into a plurality of groups based on a clustering algorithm;
(d) establishing a clustering loss function of the feature vectors based on the groups;
(e) establishing a center concentration loss function of the feature vectors based on the classification results;
(f) establishing a classification loss function of the classification results;
(g) taking a sum of the clustering loss function multiplied by a first weight, the center concentration loss function multiplied by a second weight and the classification loss function multiplied by a third weight as a total loss function;
(h) calculating a gradient of the total loss function with respect to a plurality of parameters of the deep learning model based on a backpropagation algorithm;
(i) adjusting the parameters of the deep learning model based on the gradient;
(j) repeatedly executing the operations (a) to (i) to minimize a function value of the total loss function; and
(k) building a classification model based on the deep learning model with the adjusted parameters when the function value of the total loss function has been minimized.

2. The classification model building apparatus of claim 1, wherein the clustering algorithm is a K-means algorithm.

3. The classification model building apparatus of claim 1, wherein the deep learning model is one of a convolution neural network (CNN) model, a recurrent neural network (RNN) and a combination thereof.

4. The classification model building apparatus of claim 1, wherein each of the clustering loss function and the center concentration loss function is established by using a mean squared error function.

5. The classification model building apparatus of claim 1, wherein the classification loss function is established by using a cross entropy error function.

6. A classification model building method for a classification model building apparatus, the classification model building apparatus comprising a storage and a processor, the storage storing a plurality of training data and a deep learning model, the classification model building method executed by the processor and comprising:
(a) inputting the training data into the deep learning model;
(b) retrieving a plurality of feature vectors corresponding to the training data and a plurality of the classification results corresponding to the training data from the deep learning model;
(c) dividing the feature vectors into a plurality of groups based on a clustering algorithm;
(d) establishing a clustering loss function of the feature vectors based on the groups;
(e) establishing a center concentration loss function of the feature vectors based on the classification results;
(f) establishing a classification loss function of the classification results;
(g) taking a sum of the clustering loss function multiplied by a first weight, the center concentration loss function multiplied by a second weight and the classification loss function multiplied by a third weight as a total loss function;
(h) calculating a gradient of the total loss function with respect to a plurality of parameters of the deep learning model based on a backpropagation algorithm;
(i) adjusting the parameters of the deep learning model based on the gradient;
(j) repeatedly executing the steps (a) to (i) to minimize a function value of the total loss function; and
(k) building a classification model based on the deep learning model with the adjusted parameters when the function value of the total loss function has been minimized.

7. The classification model building method of claim 6, wherein the clustering algorithm is a K-means algorithm.

8. The classification model building method of claim 6, wherein the deep learning model is one of a convolution neural network (CNN) model, a recurrent neural network (RNN) and a combination thereof.

9. The classification model building method of claim 6, wherein each of the clustering loss function and the center concentration loss function is established by using a mean squared error function.

10. The classification model building method of claim 6, wherein the classification loss function is established by using a cross entropy error function.

* * * * *